(No Model.)

D. McCOLL.
ATTACHMENT FOR CLOTH SHEARING MACHINES.

No. 244,817. Patented July 26, 1881.

WITNESSES:
C. Neveux
C. Sedgwick

INVENTOR:
D. McColl
BY Munn & Co
ATTORNEYS.

UNITED STATES PATENT OFFICE.

DAVID McCOLL, OF CLEVELAND, TENNESSEE.

ATTACHMENT FOR CLOTH-SHEARING MACHINES.

SPECIFICATION forming part of Letters Patent No. 244,817, dated July 26, 1881.

Application filed February 21, 1881. (No model.)

*To all whom it may concern:*

Be it known that I, DAVID McCOLL, of Cleveland, in the county of Bradley and State of Tennessee, have invented a new Improvement in Attachments for Cloth-Shearing Machines, of which the following is a full, clear, and exact description.

Figure 1:
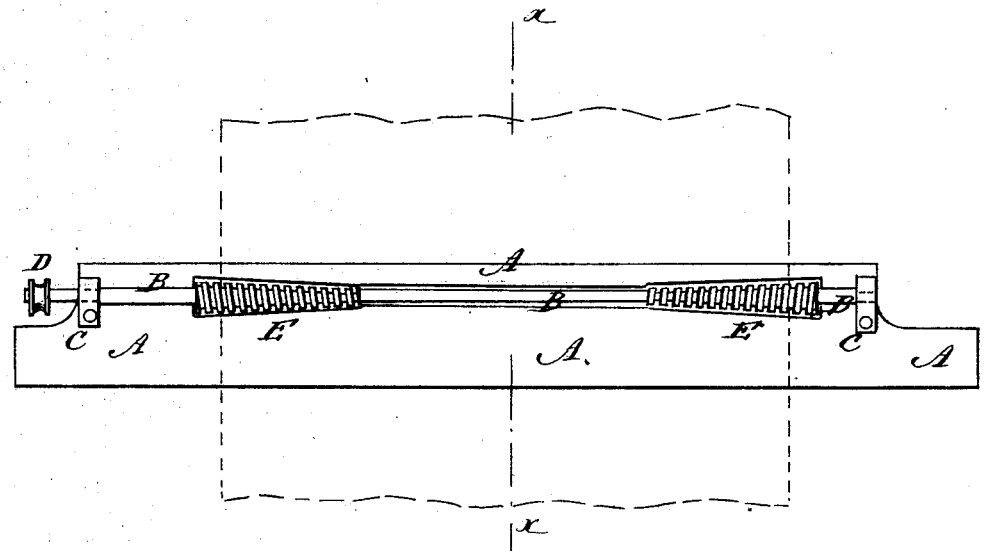
Figure 2:
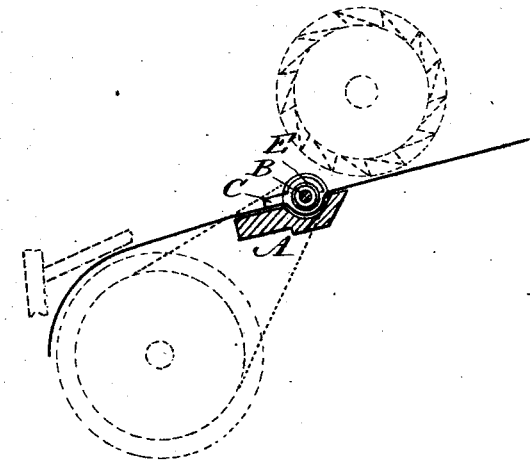

Figure 1 is a plan view of my improvement. Fig. 2 is a sectional elevation of the same, taken through the line of $x$ $x$, Fig. 1.

The object of this invention is to take the curl and slack out of the selvages of cloth, so as to present a smooth, even surface thereof to the shearing-cylinder.

The invention consists in constructing an attachment for cloth-shearing machines with a concaved rest, to be attached to the frame of the machine, and a rod revolving in the concavity of the said rest and provided with right and left handed tapered screw-threads, whereby the cloth, when passing through the machine, will be spread laterally and made to present an even surface to the shearing-cylinder, as will be hereinafter fully described.

A represents a bar the ends of which are attached to the frame of the shearing-machine in such a position that the cloth will pass over the said bar in passing from the raising-brush to the shearing-cylinder. The bar A is concaved longitudinally to receive the rod B, which revolves in bearings C, attached to the bar or rest A. One end of the rod B projects, and has a small grooved pulley, D, attached to it to receive a driving-belt, so that the said rod can be driven from the shaft of the brush-cylinder or from some other part of the machine. Upon the end parts of the rod B are formed right and left handed screw-threads, E, which gradually increase in size from their inner toward their outer ends, as shown in Fig 1. The right and left handed screws E are rotated toward the shearing-cylinder, and the rod B is designed to be run at a speed of about one thousand revolutions per minute. The cloth passes through the concave of the rest A below the screw-rod B E, sufficient space being left between the surface of the said concave and the screw-threads to allow the connections of the ends of the goods to pass between them.

By this attachment all the curls and slack of the selvages of the cloth will be taken out, and the cloth spread laterally in both directions and made smooth, so as to present an even surface to the shearing-cylinder, thus preventing all annoyance and imperfect work from the unevenness of the cloth as it passes through the shearing-machine.

Having thus described my invention, what I claim as new, and desire to secure by Letters Patent, is—

An attachment consisting of the longitudinally-concaved bar A and the rod B, arranged in bearings C, said rod having a grooved pulley, D, on a projecting end, and oppositely tapered and threaded screws E E, the whole adapted to be used in connection with a shearing-machine, as described.

DAVID McCOLL.

Witnesses:
W. D. TRAYNOR,
GEORGE J. LEA.